(12) United States Patent
Paquelet et al.

(10) Patent No.: US 7,792,210 B2
(45) Date of Patent: Sep. 7, 2010

(54) METHOD FOR MODULATING UWB PULSE SEQUENCES

(75) Inventors: Stephane Paquelet, Rennes Cedex (FR); Louis-Marie Aubert, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1056 days.

(21) Appl. No.: 10/946,249

(22) Filed: Sep. 22, 2004

(65) Prior Publication Data

US 2005/0111570 A1 May 26, 2005

(30) Foreign Application Priority Data

Oct. 9, 2003 (EP) .................................. 03292498

(51) Int. Cl.
*H03C 1/52* (2006.01)
*H04L 27/04* (2006.01)
*H04L 27/00* (2006.01)

(52) U.S. Cl. ........................................ 375/295; 375/300

(58) Field of Classification Search ................. 375/295, 375/324, 239
See application file for complete search history.

(56) References Cited

U.S. PATENT DOCUMENTS

| | | | |
|---|---|---|---|
| 3,979,677 A * | 9/1976 | Bagdasarjanz | 375/232 |
| 5,122,803 A * | 6/1992 | Stann et al. | 342/25 B |
| 5,610,907 A | 3/1997 | Barrett | |
| 5,677,927 A | 10/1997 | Fullerton et al. | |
| 5,760,740 A * | 6/1998 | Blodgett | 342/362 |
| 2001/0053175 A1 | 12/2001 | Hoctor et al. | |
| 2002/0075972 A1 * | 6/2002 | Richards et al. | 375/324 |
| 2004/0141547 A1 | 7/2004 | Paquelet | |

FOREIGN PATENT DOCUMENTS

WO   WO 01/99300 A2   12/2001

OTHER PUBLICATIONS

U.S. Appl. No. 10/902,118, filed Jul. 30, 2004, Paquelet.
U.S. Appl. No. 10/880,664, filed Jul. 1, 2004, Paquelet.
U.S. Appl. No. 10/881,526, filed Jul. 1, 2004, Paquelet et al.
U.S. Appl. No. 10/946,236, filed Sep. 22, 2004, Paquelet.
U.S. Appl. No. 10/950,505, filed Sep. 28, 2004, Paquelet.

* cited by examiner

*Primary Examiner*—David C Payne
*Assistant Examiner*—Brian J Stevens
(74) *Attorney, Agent, or Firm*—Oblon, Spivak, McClelland, Maier & Neustadt, L.L.P.

(57) ABSTRACT

The present invention relates to a method for transmitting data in the form of at least one sequence Tsg of Ns pulses, each pulse being enclosed within a predetermined time chip Tc.

The method according to the invention includes at least one symbol encoding step, in the course of which each pulse pj (for j=1 to Ns) of an ith pulse sequence Tsg is multiplied by a value Vi representative of a symbol to be carried by said sequence.

By virtue of the invention, the information carried by the pulse sequence Tsg will essentially be represented by the power carried by this sequence Tsg, which power is related to the amplitude of the pulses pj. This information may then be recovered by a receiver without said receiver having to map precisely, with respect to time, the received pulse sequences.

11 Claims, 1 Drawing Sheet

METHOD FOR MODULATING UWB PULSE SEQUENCES

The present invention relates to a method for transmitting data in a telecommunication system including at least one transmitter and one receiver, said transceiver being intended to transmit a signal formed by at least one sequence of Ns pulses over Ns time windows, each pulse being enclosed within a time chip whose position within its relevant time window is defined by a chip number.

Such data transmission methods are currently studied with the aim of assessing the relevance of so-called Ultra-Wide Band telecommunication systems (further referred to as UWB systems). In such a system each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

The above-described signal may form a carrying signal on which information can be encoded by modulation of said carrying signal. The inventors have observed that, because of the shortness of the pulses involved, a precise synchronization with a given pulse sequence will be difficult to perform at the receiver end, so that the chosen modulation scheme should involve as few time-related parameters as possible in order to be cost-efficient.

The present invention thus aims at providing a modulation scheme according to which the information carried by pulse sequences may be recovered at the receiver end without having to map precisely, with respect to time, the received pulse sequences.

Indeed, a method for transmitting data as described in the opening paragraph is characterized according to the invention in that it includes at least one symbol encoding step to be executed before transmission of said pulse sequence, in the course of which symbol encoding step each pulse sequence is multiplied by a value representative of a symbol to be carried by said pulse sequence.

By virtue of this modulation scheme, the information carried by signals transmitted in Ultra-Wide Band telecommunication systems according to the invention may essentially be represented by the power carried by these signals, which power is related to the amplitude of the pulses included within such a signal.

According to a first variant of the invention, each pulse of a given sequence is to be multiplied by a value which is randomly chosen equal to +1 or −1 in the course of the symbol encoding step.

This first variant of the invention enables to obtain a random distribution of positive and negative pulses, which does not affect the information carried by said pulses because said information is related to a square form of said pulses, but allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications Commission.

According to a second variant of the invention, all pulses of a same pulse sequence are to be submitted to a time jitter in the course of the symbol encoding step.

Such a time-jitter will preferably be kept small with respect to a delay spread which will be induced by a communication channel through which the modulated signal will be transmitted. This time-jitter does not affect the information carried by the pulse sequences, and mainly adds an additional degree of flexibility to the modulation scheme according to the invention.

According to a third variant of the invention, all pulses of a same pulse sequence have essentially a same shape.

Though pulses of a same sequence may have different shapes, provided that they all have essentially a same width and carry a same quantity of energy, the choice of a same shape for all pulses belonging to a same sequence enables to simplify the implementation of the modulation scheme according to the invention. The pulses may for example have a shape is defined as a derivative of the second order of a Gaussian function. Other pulse shapes known to those skilled in the art may, of course, be used in this same purpose.

According to a fourth variant of the invention, each signal to be transmitted is constituted by a superimposition of a predetermined number of pulse sequences, each pulse sequence having been subjected to a symbol encoding step and corresponding to one of several sub-bands into which a total bandwidth available for transmission has previously been divided.

This fourth variant of the invention enables to transmit simultaneously several symbols through a same communication channel, and thus to significantly increase the throughput of a telecommunication system in which such a variant of the invention is embodied.

According to one of its hardware-oriented aspects, the invention also relates to a telecommunication system including at least one transmitter and one receiver, said transmitter being intended to transmit a signal formed by at least one pulse sequence of Ns pulses over Ns time windows, each pulse being enclosed within a time chip whose position within its relevant time window is defined by a chip number, system in which the transmitter includes symbol encoding means intended to multiply each pulse sequence by a value representative of a symbol to be carried by said pulse sequence.

According to a first variant of this hardware-related aspect, the transmitter further includes a random binary generator for randomly generating values equal to +1 or −1 with which successive pulses of a pulse sequence are to be multiplied.

According to a second variant of this hardware-related aspect, the transmitter further includes time-delaying means for subjecting all pulses of a same pulse sequence to a time jitter.

According to yet another variant of this hardware-related aspect, the transmitter further includes signal combination means intended to receive a predetermined number of pulse sequences, each pulse sequence having been generated by symbol encoding means and corresponding to one of several sub-bands into which a total bandwidth available for transmission has previously been divided, said signal combination means being intended to combine all said pulse sequences into a signal to be transmitted.

According to another of its hardware-oriented aspects, the invention also relates to a device intended to transmit a signal formed by at least one sequence of Ns pulses over Ns time windows, each pulse being enclosed within a time chip whose position within its relevant time window is defined by a chip number, which transmitter includes symbol encoding means intended to multiply each pulse sequence by a value representative of a symbol to be carried by said pulse sequence.

The characteristics of the invention mentioned above, as well as others, will emerge more clearly from a reading of the following description given in relation to the accompanying figures, amongst which:

Figure 1:
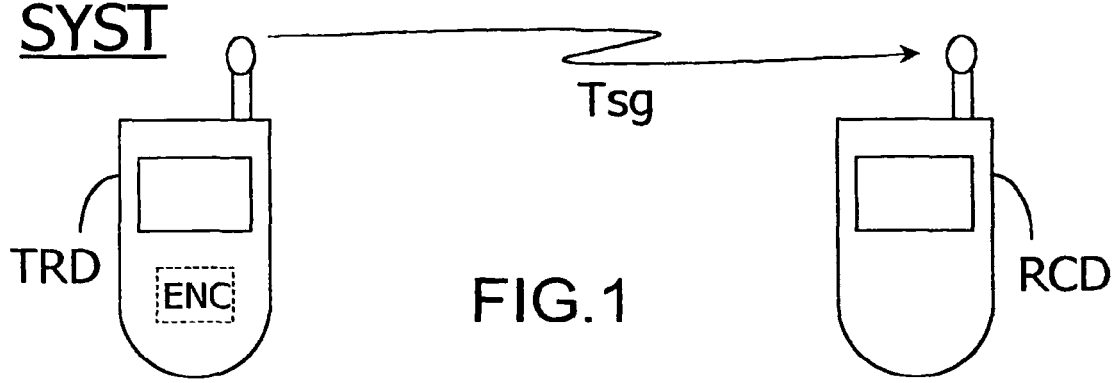
FIG. 1 is a functional diagram depicting a telecommunication system in which the invention is used.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at least one sequence of Ns pulses pj (for j=1 to Ns) over Ns time windows Tf, each pulse being enclosed within a time chip Tc whose position within its relevant time window is defined by a chip number cj (for j=1 to Ns). The number Ns of pulses included in this sequence may, for example, be chosen equal to 128, while the width of each time window Tf may be chosen equal to 100 nanoseconds, with a width of 1 nanosecond for each time chip Tc.

According to the present invention, the transmitter TRD includes symbol encoding means ENC intended to multiply each pulse sequence by a value, preferably an integer value, representative of a symbol to be carried by said pulse sequence.

The information carried by the transmitted signal Tsg may thus essentially be represented by the power carried by this signal Tsg, which power is related to the amplitude of the pulses included within said signal Tsg. This information may then be recovered by the receiver RCD without said receiver RCD having to map precisely, with respect to time, the received pulse sequences.

Figure 2:
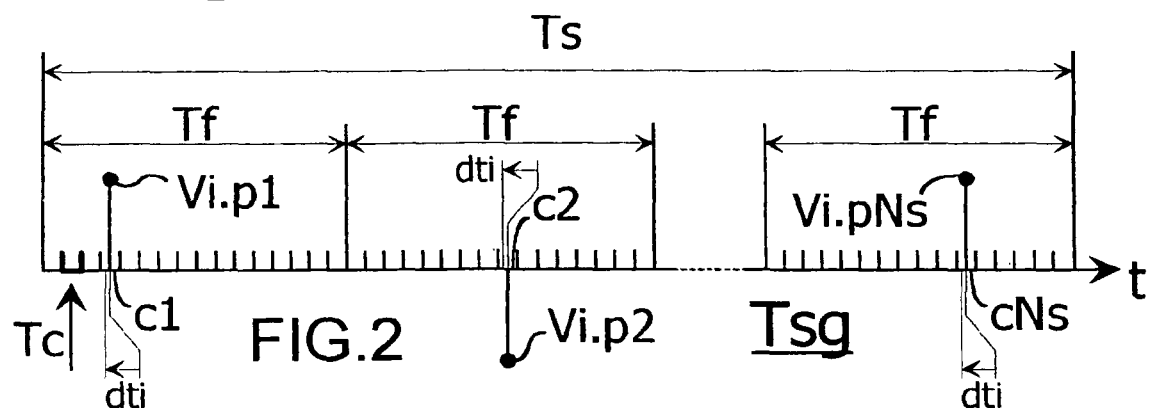
FIG. 2 is a chronogram depicting a pulse sequence constituting a carrying signal transmitted in such a telecommunication system.

FIG. 2 depicts such a transmitted signal Tsg in the form of a chronogram, according to which each pulse sequence has a total duration Ts divided into time windows having each a duration Tf, each time window being sub-divided into time chips Tc, a single time chip within each window being intended to enclose a pulse pj (for j=1 to Ns), which single time chip is identified by means of a chip number cj. The transmitter of this transmitted signal Tsg will thus be identified by a signature Sg=(c1, c2 . . . cNs) jointly formed by all above-mentioned chip numbers cj (for j=1 to Ns), which signature Sg is in itself quite sturdy and may thus be reliably and accurately communicated to all potential receivers.

In accordance with the invention, each pulse pj (for j=1 to Ns) belonging to the pulse sequence shown in this picture has been multiplied by a same integer value Vi representative of a symbol to be carried by said pulse sequence, in the form of the power carried by this sequence, the reference "i" being indicative of a reference number allocated to the pulse sequence under consideration.

Furthermore, the pulses pj (for j=1 to Ns) are multiplied by values αj which are randomly chosen equal to +1 or −1 in the course of the symbol encoding step, so that in the example shown here, the second pulse p2 is negative.

Such a random distribution of positive and negative pulses, which does not affect the information carried by said pulses because said information is related to a square form of said pulses, allows to prevent appearance of high-amplitude peaks in the spectral domain.

All pulses pj (for j=1 to Ns) of the pulse sequence shown here may additionally be submitted to a time jitter dti in the course of the symbol encoding step.

The time-jitter introduced by the time-delaying means will be kept small with respect to a delay spread which will be induced by a communication channel through which the modulated signal will be transmitted. The delay spread may have, for example, a value of 100 nanoseconds. Such a time-jitter won't affect the information carried by each pulse sequence, and mainly adds an additional degree of flexibility to the modulation scheme according to the invention.

The transmitted signal Tsg may thus be expressed in the following form:

$$Tsg(t) = \sum_{i,j} Vi \cdot \alpha j \cdot pj(t - cj - j \cdot Tf - dti)$$

In an alternative embodiment of the invention not shown here, the transmitted signal Tsg may be constituted by a superimposition of a predetermined number of pulse sequences, each pulse sequence having been subjected to a symbol encoding step and corresponding to one of several sub-bands into which a total bandwidth available for transmission has previously been divided.

In such an embodiment, each pulse sequence corresponding to a given sub-band of rank k (with k=1 to K where K is the total number of sub-bands) will be expressed as:

$$Tsgk(t) = \sum_{i,j} Vki \cdot \alpha kj \cdot pkj(t - ckj - j \cdot Tf - dtki),$$

with $$Tsg(t) = \sum_{k} Tsgk(t)$$

This fourth variant of the invention enables to transmit simultaneously several symbols through a same communication channel, and thus to significantly increase the throughput of a telecommunication system in which such a variant of the invention is embodied.

Figure 3:
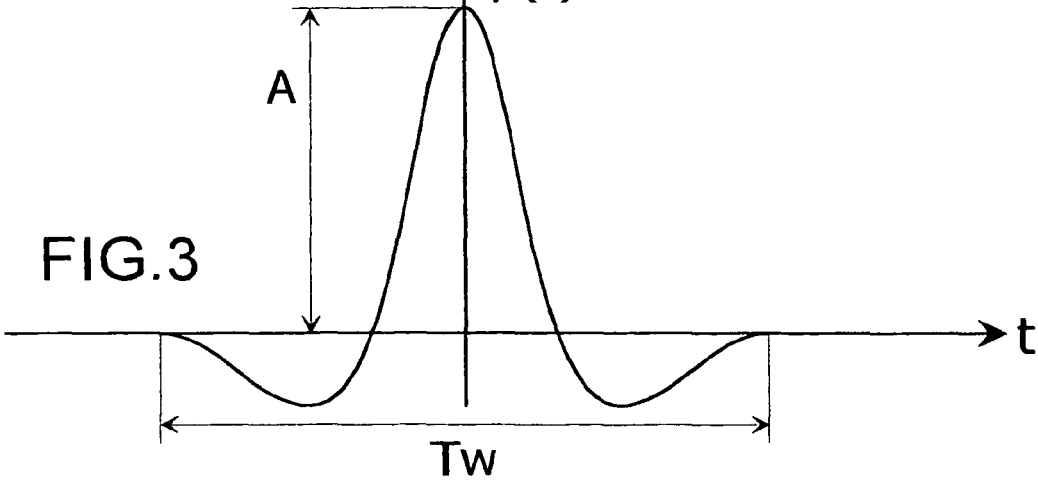
FIG. 3 is a chronogram depicting a pulse model which may be used for generating such a sequence.

FIG. 3 is another chronogram which depicts a possible shape p(t) which may be chosen for constituting the above-mentioned pulses. Pulses pj(t) (for j=1 to Ns) of a same sequence may have different shapes, provided that they all have essentially a same width and carry a same quantity of energy. All pulses pj(t) (for j=1 to Ns) belonging to a same sequence may, however, have a same shape such as the shape p(t) depicted here, which is defined as a derivative of the second order of a Gaussian function, which may be expressed mathematically as $p(t)=A.[1-4\pi(t/Tw)^2].\exp(-2\pi(t/Tw)^2)$. Other pulse shapes known to those skilled in the art may, of course, be used in this same purpose.

Figure 4:
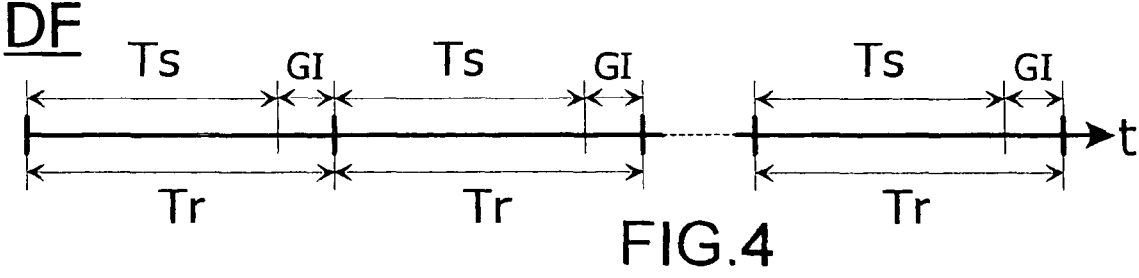
FIG. 4 is a chronogram depicting a data frame including a plurality of pulse sequences.

FIG. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with Tr=Ts+GI, and including each a pulse sequence as described above.

In particular applications, the signature of any given transmitter may be dynamically generated within said transmitter and may thus vary from one pulse sequence to another. Such a signature may for example be generated by means of a specific control of a pre-programmed shiftable register. In such applications, any given receiver must be able to re-generate each signature corresponding to each pulse sequence, which may be achieved by providing said receiver with a shiftable register to be pre-programmed and controlled according to instructions sent beforehand to said receiver by a control infrastructure of the telecommunication system, e.g. in the form of Medium Access Control signals.

A device intended to receive such a data frame DF must thus only be able to measure quantities representative of the successive amounts of power carried by the successive pulse sequences, in order to identify the informational content of the dataframe DF, without having to map precisely, with respect to time, the received pulse sequences.

The invention claimed is:

1. A method for transmitting data in a telecommunication system including at least one transmitter and one receiver, the method comprising the steps of:

forming a signal by at least one pulse sequence of Ns pulses over Ns time windows, each pulse being enclosed within a time chip whose position within a respective time window of the time chip is defined by a chip number; and encoding each of said at least one pulse sequences with a symbol before transmission of said respective pulse sequences, said encoding step including, multiplying each pulse of said at least one pulse sequence by (i) a value representative of a power of the symbol carried by the at least one pulse sequence and (ii) a +1 or −1 value, wherein said +1 or −1 values are randomly chosen and the value that is representative of the power of the symbol is the same for each pulse of said respective pulse sequences.

2. The method as claimed in claim 1, wherein all pulses of a same pulse sequence are submitted to a time jitter in the course of the symbol encoding step.

3. The method according to claim 1 wherein all pulses of a same pulse sequence have essentially a same shape.

4. The method according to claim 1 wherein each signal to be transmitted is constituted by a superimposition of a pre-determined number of pulse sequences, each pulse sequence having been subjected to the symbol encoding step and corresponding to one of several sub-bands into which a total bandwidth available for transmission has previously been divided.

5. The method for transmitting data in a telecommunication system according to claim 1, wherein the value representative of the symbol that is multiplied to each pulse of said at least one pulse sequence is in the form of a power carried by the respective at least one pulse sequence.

6. A telecommunication system comprising:
a receiver;
a transmitter configured to transmit a signal formed by at least one pulse sequence of Ns pulses over Ns time windows, each pulse being enclosed within a time chip whose position within a respective time window of the time chip is defined by a chip number; and
a random binary generator configured to randomly generate values equal to +1 or −1,
wherein the transmitter includes symbol encoding means for multiplying each pulse of said at least one pulse sequences by (i) a value representative of a power of the symbol carried by the at least one pulse sequence and (ii) said +1 or −1 values, and the value representative of the power of the symbol is the same for each pulse of said respective pulse sequences.

7. The telecommunication system as claimed in claim 6, wherein the transmitter further includes time-delaying means for subjecting all pulses of a same pulse sequence to a time jitter.

8. The telecommunication system according to claim 6 wherein the transmitter further includes signal combination means for (a) receiving a predetermined number of pulse sequences, each pulse sequence having been generated by the symbol encoding means and corresponding to one of several sub-bands into which a total bandwidth available for transmission has previously been divided, and (b) combining all said pulse sequences into a signal to be transmitted.

9. The telecommunication system according to claim 6, wherein the value representative of the symbol that is multiplied to each pulse of said at least one pulse sequence is in the form of a power carried by the respective at least one pulse sequence.

10. A transmitter comprising:
signal forming means forming a signal by at least one sequence of Ns pulses over Ns time windows, each pulse being enclosed within a time chip whose position within a respective time window of the time chip is defined by a chip number;
symbol encoding means for multiplying each pulse of a pulse sequence by a value representative of a power of a symbol to be carried by said pulse sequence; and
a random binary generator configured to randomly generate values equal to +1 or −1, wherein the transmitter includes symbol encoding means for multiplying each pulse of said at least one pulse sequences by said +1 or −1 values, and the value representative of the power of the symbol is the same for each pulse of said respective pulse sequences.

11. The transmitter according to claim 10, wherein the value representative of the symbol that is multiplied to each pulse of said at least one pulse sequence is in the form of a power carried by the respective at least one pulse sequence.

* * * * *